United States Patent [19]

Stover

[11] 4,400,421
[45] Aug. 23, 1983

[54] FOUR-DIRECTIONAL STRUCTURE FOR REINFORCEMENT

[75] Inventor: Edward R. Stover, Akron, Ohio

[73] Assignee: The United States of America as represented by the Secretary of the Air Force, Washington, D.C.

[21] Appl. No.: 448,161

[22] Filed: Dec. 9, 1982

[51] Int. Cl.³ .................................................. B32B 5/12
[52] U.S. Cl. .............................. 428/113; 244/158 A; 428/105; 428/114; 428/221; 428/297; 428/357; 428/364; 428/367; 428/397; 428/408; 428/902
[58] Field of Search ............... 428/105, 107, 108, 109, 428/112, 113, 114, 297, 357, 364, 367, 397, 408, 902; 244/158 A, 121, 163

[56] References Cited

U.S. PATENT DOCUMENTS

| | | | |
|---|---|---|---|
| 3,837,985 | 9/1974 | Chase | 161/55 |
| 3,949,126 | 4/1976 | Crawford, Jr. | 428/113 |
| 4,001,478 | 1/1977 | King | 428/257 |
| 4,168,337 | 9/1979 | Maistre | 428/113 |
| 4,201,611 | 8/1980 | Stover | 156/155 |
| 4,219,597 | 8/1980 | Maistre | 428/105 |
| 4,252,588 | 2/1981 | Kratsch et al. | 156/73.6 |

OTHER PUBLICATIONS

M. A. Maistre, "Extended Abstracts & Program", 14*th Biennial Conference on Carbon*, Jun. 25-29, 1979, pp. 230-231.

P. Lamico, "Recent Improvements in 4D Carbon-Carbon Materials", *AIAA/SAE*, 13th Propulsion Conference, Jul. 11-13, 1977.

*Primary Examiner*—James J. Bell
*Attorney, Agent, or Firm*—Donald J. Singer; Charles E. Bricker

[57] ABSTRACT

The structure comprises four groups of elongated rectilinear elements, with the elements of each group parallel to one another. The elements of three of the groups are mutually orthogonal and the elements of the other group are disposed diagonally to the elements of two of the three mutually orthogonal groups. The structure is useful for fabricating nosetips for maneuvering re-entry vehicles.

21 Claims, 7 Drawing Figures

4,400,421

FOUR-DIRECTIONAL STRUCTURE FOR REINFORCEMENT

RIGHTS OF THE GOVERNMENT

The invention described herein may be manufactured and used by or for the Government of the United States for all governmental purposes without the payment of any royalty.

BACKGROUND OF THE INVENTION

Reinforced composites are used in a wide variety of applications. The best known composites are made from two-dimensional fabrics and/or fibers dispersed in a resin or plastic matrix. These composites are basically a resin or plastic structure to which reinforcing fabrics or fibers have been added to enhance the physical properties of the structure. The fabric or fibers have no self-supporting three-dimensional integrity. Nor do they provide significant, if any, interyarn friction along the three orthogonal axes.

These prior art reinforced materials have the serious drawback of lacking significant strength between one layer of fabric and its adjacent layers. Reinforcement effectively occurs in one plane only and is greatest within this plane in the directions parallel to the interwoven yarns. Little or no reinforcement is present in the direction perpendicular to the fabric plane.

Recent advances in the field of aerospace technology have created a need for high strength, temperature resistant materials that possess the necessary properties needed to protect re-entry vehicles from the severe thermomechanical stresses encountered within their re-entry environment. Existing carbon-carbon materials have proven somewhat effective as materials for nose tip application and show adequate thermal stress performance. Unfortunately, however, these materials are deficient in mechanical strength for some applications and have shown unpredicted anomalies in their ablation characteristics.

A wide range of reinforced, three-dimensional composite structures are now available. The simplest of these structures is the three-directional (3D) structure which has generally reinforcing elements which are mutually orthogonal. The most complex, which has been described, is a thirteen-directional (13D) structure. These thirteen directions, with reference to a cube, form three subgroups: the three edges, the four long diagonals, and the six diagonals of the faces.

Although the 3D structure is well balanced, compact and easy to fabricate, it does not generally provide the desired level of resistance to deflection and fracture due to shear deformation in bending. As the number of directions of reinforcement is increased, the resistance to shear compared with the 3D structure is improved, but the difficulty of fabrication of more complex structures increases greatly. Thus, what is desired is a structure which is relatively easy to fabricate and which exhibits desired mechanical properties.

Accordingly, it is a primary object of the present invention to provide an improved multidimensional composite structure.

Another object of the present invention is to provide a protective material for re-entry vehicle nose cones.

Yet another object of the present invention is to provide maneuvering re-entry vehicle nose tips having improved properties.

These and other objects and advantages of the present invention will become more readily apparent upon consideration of the following detailed description when taken in conjunction with the accompanying drawings.

SUMMARY OF THE INVENTION

In accordance with the present invention, there is provided a four-directional (4D) reinforcement structure having a plurality of repeating units, each unit consisting of a first, a second, a third and a fourth group, each group consisting of a plurality of elongated rectilinear elements in parallel relation and extending parallel to a respective direction and arranged in a plurality of rows; wherein a first portion of said first group of elements is disposed in a first plane and extend parallel to a first direction; wherein said second group of elements is disposed in a second plane parallel to said first plane, said second group extending parallel to a second direction, said second direction being approximately diagonal to said first direction; wherein a second portion of said first group is disposed in a third plane parallel to said first plane, and extending parallel to said first direction; wherein said third group of elements is disposed in a fourth plane parallel to said first plane, said third group extending parallel to a third direction, said third direction being approximately diagonal to said first direction and opposite the orientation of said second direction; and wherein said fourth group of elements extend parallel to a fourth direction, said fourth direction being substantially perpendicular to said first plane, said fourth group being disposed in a plurality of spaced parallel planes.

Also provided in accordance with the present invention is an integrated structure which combines the 4D construction, described above, with a 3D construction.

The 4D construction is particularly adapted for use in the fabrication of nose tips for re-entry vehicles. The 4D/3D construction is particularly adapted for use in the fabrication of nose cones.

DESCRIPTION OF PREFERRED EMBODIMENTS

Figure 1:
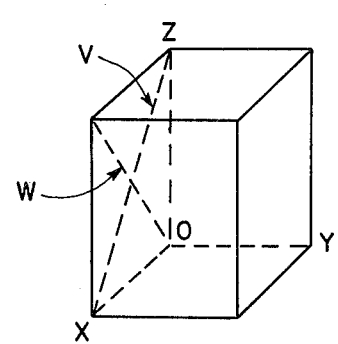
FIG. 1 is a geometric representation showing the orientation of the reinforcing elements of a unit cell according to the invention.
Figure 3:
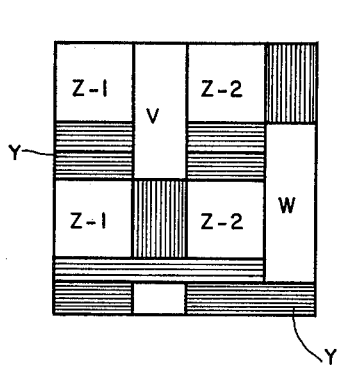
FIGS. 3, 4 and 5 are transverse sections of the reinforcing structure of FIG. 2, taken along the Z, Y and X axes, respectively.
Figure 4:
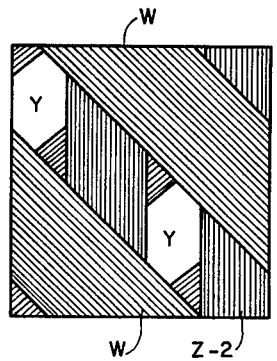
Figure 5:
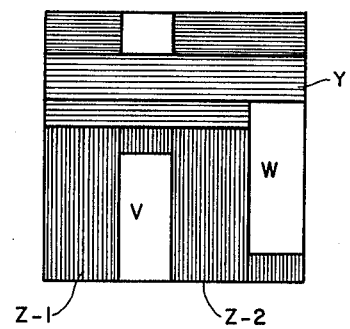

Referring to the drawings, wherein like characters refer to like parts, FIG. 1 makes it possible to locate with reference to a three-dimensional cartesian Coordinate System having X, Y and Z axes intersecting at point O, the four directions along which the four groups of reinforcing elements constituting the 4D structure of this invention will be disposed. The first group of elements, hereinafter designated by the reference character Z, is disposed parallel to the Z axis. The fourth group of elements, hereinafter designated by the reference character Y, is disposed parallel to the Y axis. The second and third groups of elements, designated by the reference characters V and W, respectively, are shown disposed in the X-Z plane (the plane determined by the X and Z axes) in which these elements extend approximately perpendicular to each other and at about 45° angles to the X and Z axes.

Figure 2:
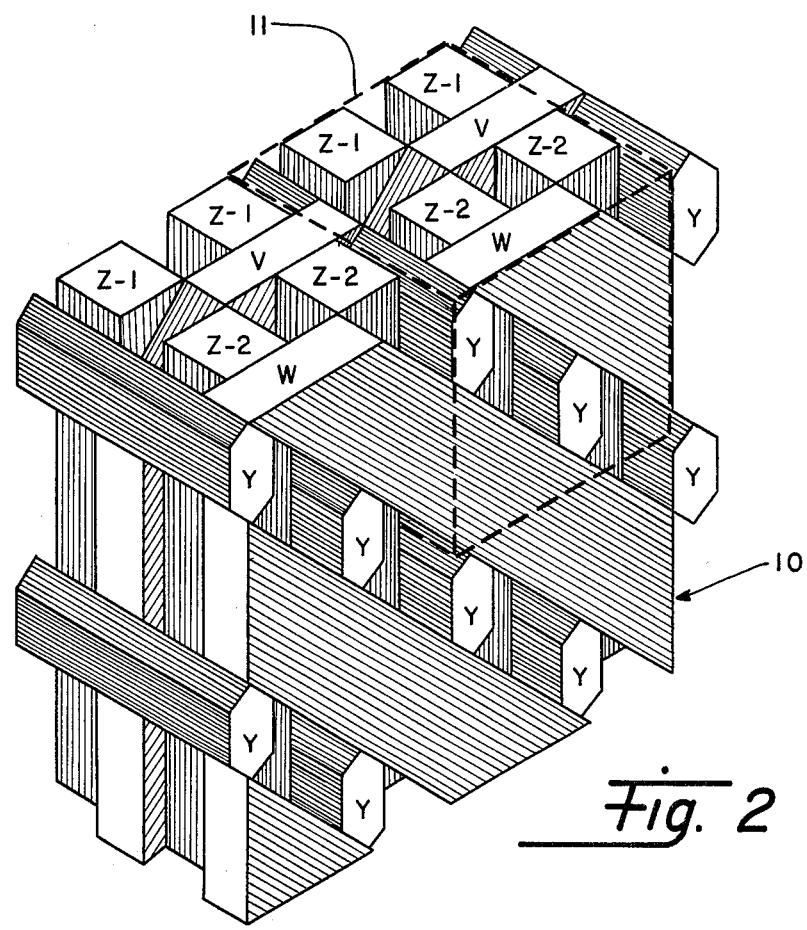
FIG. 2 is a perspective view of a unit cell of a reinforcing structure according to the invention.

FIGS. 2-5 show the manner in which the elements constituting the structure of the present invention are disposed parallel to the directions thus defined. Shown in FIG. 2 is a rectangular block of matrix material 10, formed of a plurality of unit cells 11, one of which is indicated by the dashed outline. The actual composite is formed of a plurality of similar such cells. In the unit cell 11, a first portion of the Z group of elements, hereinafter designated Z-1, is disposed at spaced intervals in a first plane parallel to the Z-X plane and parallel to the Z axis. The V group of elements is disposed in a second plane, also parallel to the Z-X plane, adjacent to the Z-1 elements, at spaced intervals and at an angle approximately 45° relative to the Z axis. A second portion of the Z group of elements, hereinafter designated Z-2, is disposed adjacent the V elements, at spaced intervals in a third plane parallel to the Z-X plane and parallel to the Z axis. The W group of elements is disposed adjacent the Z-2 elements in a fourth plane parallel to the Z-X plane, at spaced intervals at an angle approximately 45° relative to the Z axis, and opposite the direction of the V elements.

The remaining group of elements, the Y elements, is disposed at spaced intervals parallel to the Y axis in a plurality of planes parallel to the Y-X plane. The Y elements are disposed in the interstices provided by the Z-1, V, Z-2 and W elements in a manner well known in the art.

The improved method for the preparation of a reinforced composite requires the preparation of rigidized rods. These rods are produced by a pultrusion process whereby unidirectional groups of graphite or carbon yarn having sufficient fibers to make up a desired end count are assembled and impregnated with a thermosetting or thermoplastic resin or binder. Examples of suitable carbon or graphite yarns include Thornel 50 or Thornel 300, available commercially from Union Carbide Company, and HM 3000 or HM 1000, available commercially from Hercules, Inc. Suitable thermosetting resins include phenolic, epoxy and furanic resins and the like. Suitable thermoplastic resins include coal tar pitch, petroleum pitch, polyvinyl acetate, acrylic resin, and the like.

The impregnated yarn groups are drawn through a die which is warmed to approximately 150° C. and which has a suitable shape. The specific temperature of the die is determined by the cure characteristics or thermoplastic characteristics of the particular resin or binder.

The Z group of elements have a substantially square cross section; the V and W elements are the same and have a rectangular cross section, and the Y elements have an elongated hexagonal cross section. The Z elements are spaced apart in both the X and the Y directions a distance ranging from about 0.50 to 0.75, preferably about 0.70 times the face dimension of Z elements. The interelement spacings of the Z elements can be the same or different in the X and Y directions, with the same spacings being presently preferred. It can be seen that the width of the V and W elements is determined by the interelement spacing of the Z elements in the Y direction and the width of the Y elements is determined by the interelement spacing of the Z elements in the X direction. Since it is presently preferred that the interelement spacing of the Z elements in the X and Y directions be the same, it will be appreciated that the width of the Y elements will be approximately the same as the width of the V and W elements.

The depth of the V and W elements can range from about 1.4 to about 2.8 times the width of these elements. It is presently preferred that the depth of these elements be about 2.0 to 2.20, more preferably, about 2.1 times their width. The dimension of the Y elements in the Z direction is determined by the dimension of the interstices provided by the Z, V and W elements. In general this dimension can range from about 1.50 to 3.25 times the width of the Y element in the X direction, preferably about 2.0 times such width.

The rods are assembled into the preferred geometric structure (see FIG. 2) which is carefully prepared to insure strict conformity with the preferred pattern. The assembly process may, for example, consist of stacking alternate and adjacent sheets of spaced apart Z-1, V, Z-2 and W elements followed by insertion of the Y elements to complete the aforesaid structure. When all the interstices have thus been filled, the reinforcement is finished and can be coated according to one of the ways described below.

It may be desirable to incorporate a particulate material, such as carbon particles, or a ceramic material such as silicon dioxide, silicon nitride, silicon carbide, titanium carbide and the like, including mixtures of carbon particles and ceramic materials, into the reinforcement structure. Such particulate material can be introduced into the reinforcement structure either as a dry powder, or in a paste or liquid suspension, in which the particles are small enough to pass through the interstices between the various elements. The particulate material may be introduced into the reinforcement structure either prior to or following coating of the reinforcement.

The composite is formed either by sintering the reinforcement structure by solidifying the impregnated precursor, thereby avoiding the requirement for other materials, or by the dry or liquid process, or by a combination of these methods. The dry process consists of providing deposition of pyrolytic carbon inside the structure of the reinforcement by decomposition of a hydrocarbon gas such as methane. In the liquid process, the porous texture of the reinforcement is impregnated with a thermosetting resin or a thermoplastic carbon precursor, such as a phenolic resin, a furanyl resin, coal tar pitch, and the like, that is converted to carbon by heat treatment. The impregnation and carbonization cycle may be repeated as often as necessary to densify the composite to a desired degree.

Thus, according to one embodiment of the invention, a reinforcement structure, or preform, may be rigidized by impregnating the preform with pitch or a mixture of graphite powder in a pitch, and then carbonized. The resulting rigidized preform may then be impregnated with a mixture of tantalum oxalate and a sugar, such as sucrose, heated to about 600° C. to pyrolyze the organic matter and thereafter heated to about 2700° C. to form tantalum carbide. The tantalum carbide-impregnated preform is then subjected to at least one, preferably two or more impregnation and carbonization cycles to fill the interstices to a desired degree.

A presently preferred method of processing, which provides superior properties to resist bending, consists of several cycles of impregnation, baking and graphitization, followed by a heat treatment. More specifically, the preform is first impregnated with pitch at about 1 atm pressure. The impregnated preform is heated at a controlled rate, e.g., 6° C./hr, to about 650° to 725° C. The thus-baked impregnated preform is then graphitized at about 1 atm and a temperature of about 2300° C. or 2750° C. The impregnation, baking, graphitization cycle is repeated four times at about 15,000 psi baking pressure and a graphitization temperature of about 2300° C. Finally, the graphitized structure is subjected to a heat treatment by heating to about 1500° C. for about 4 hours. The final heat treatment provides a structure having increased resistance to shear.

According to another embodiment of the present invention, the V, W, Y and Z elements have an end count ratio of 3:3:2:3, respectively. The V, W and Z elements may be prepared by drawing a suitable carbon or graphite yarn having a desired end count, such as, for example, Hercules HM 3000, through a suitably shaped die, and the Y elements may be prepared by drawing a suitable carbon or graphite yarn having a desired end count, such as, for example, two (2) Hercules HM 1000, through a suitably shaped die, e.g., corresponding to the element shapes shown in FIG. 2.

Figure 6:
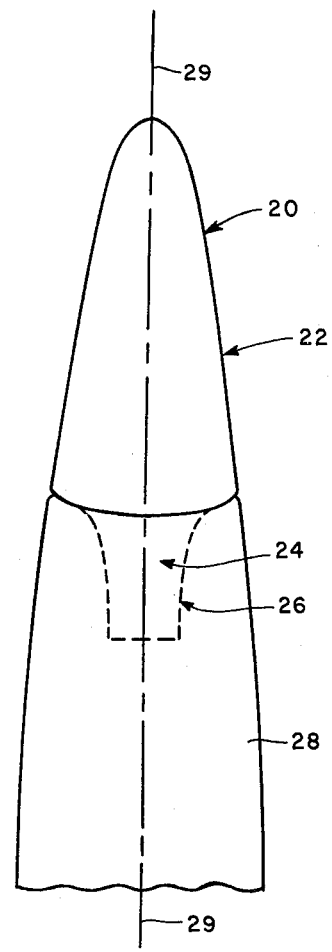
FIG. 6 is a pictorial representation of a nose cone which incorporates a nose tip according to the invention.

The reinforced composite of this invention is particularly useful for the fabrication of re-entry vehicle nose tips, such as the one shown by way of example in FIG. 6. The nosetip, designated generally by the reference numeral 20 comprises a tip portion 22 and a plug or pin portion 24 for fitting into a socket 26 in a nose cone 28. The nosetip 20 is machined from a billet of the reinforced composite of this invention, with the Z elements running in the axial direction 29—29 of the nosetip.

The nosetip 20 is installed in the nosecone 28 by a pressure fit of the plug portion 24 into the socket 26, or preferably, by use of a suitable, high-temperature adhesive. The nosetip 20 is located in association with the nosecone 28 in such a manner that the V, W and Z elements lie in planes parallel to the plane of bending of the nosetip/nosecone assembly, i.e., such that the expected shear force will be applied parallel to the X axis of the reinforced composite.

Figure 7:
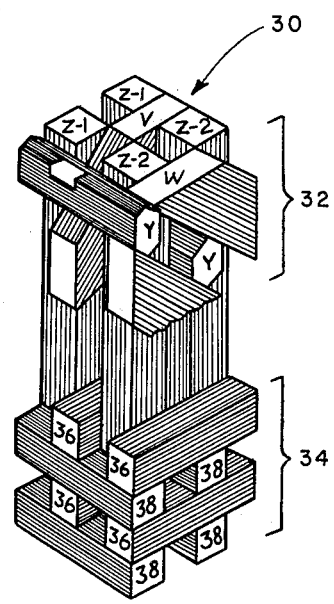
FIG. 7 illustrates a 4D unit cell having certain reinforcing elements in common with a 3D unit cell.

FIG. 7 illustrates a unit cell reinforcing structure 30 having a 4D portion 32 and a 3D portion 34 with the Z elements common to both portions. The portions 32 and 34 are illustrated as being spaced apart in order to illustrate the commonality of the Z elements. In an actual structure these portions are contiguous. In the 4D portion 32, the Z, V, W and Y elements are arranged as described previously. The Z elements of the 4D portion 32 extend outwardly therefrom and comprise one of the three groups of elements in the 3D portion 34. The two remaining groups of elements in portion 34 are arranged in a plurality of planes parallel to the X-Y plane (FIG. 1). One of these remaining groups of elements consists of a plurality of elements 36 disposed at spaced intervals extending parallel to the X axis (FIG. 1) and the other of these remaining groups of elements consists of a plurality of elements 38 disposed at spaced intervals extending parallel to the Y axis (FIG. 1). The elements 36 and 38 may be square, as illustrated, or some other shape. The width of the elements 36, in the Y direction, should be substantially the same as the width of the V and W elements, and the width of the elements 38, in the X direction, should be substantially the same as the width of the Y elements.

The integrated structure of FIG. 7 is particularly useful for fabrication of a nosetip 20, such as that shown in FIG. 6, which may be machined from a single piece of a composite having the reinforcing structure shown in FIG. 7, with the tip portion 22 comprising the 3D portion 34 of structure 30, the plug portion 24 comprising the 4D portion 32 of structure 30, and the Z elements running in the axial direction 29—29 of the nosetip 20.

The 4D carbon-carbon material prepared in accordance with this invention provides nosetips which have improved shape stability for ablation applications. The 4D structure provides, in addition to high axial reinforcement, significant resistance to shearing stresses, particularly in the region of support when a nosetip is subjected to bending during maneuvering of a re-entry vehicle.

Various modifications of the present invention may be made without departing from the spirit and scope of the appended claims.

I claim:

1. A 4-directional reinforcement structure for a composite material which comprises a plurality of repeating units, each unit consisting of a first, a second, a third and a fourth group, each group consisting of a plurality of elongated rectilinear elements in parallel relation and extending parallel to a respective direction and arranged in a plurality of rows; wherein a first portion of said first group of elements is disposed in a first plane and extends parallel to a first direction; wherein said second group of elements is disposed in a second plane parallel to said first plane, said second group extending parallel to a second direction which is approximately diagonal to said first direction; wherein a second portion of said first group is disposed in a third plane parallel to said first plane and extend parallel to said first direction; wherein said third group of elements is disposed in a fourth plane parallel to said first plane and extend parallel to a third direction which is approximately diagonal to said first direction and opposite the orientation of said second direction; and wherein said fourth group of elements is disposed in a plurality of spaced parallel planes, each plane being substantially perpendicular to said first direction, said fourth group extending parallel to a fourth direction which is substantially perpendicular to said first plane.

2. The structure of claim 1 wherein the elements of said first group have a substantially square cross section, the elements of said second and said third groups have rectangular cross sections and the elements of said fourth group have an elongated hexagonal cross section.

3. The structure of claim 2 wherein the interelement spacings of the elements of said first group is approximately 0.50 to 0.75 times the face dimension of said first group elements; wherein the width of the elements of said second group, said third group and said fourth group is approximately the same as the interelement spacing of said elements of said first group; wherein the depth of the elements of said second and said third groups is approximately 1.4 to 2.8 times the width of said elements; and wherein the height of the elements of said fourth group is approximately 1.50 to 3.25 times the width of said elements.

4. The structure of claim 3 wherein the interelement spacing of the elements of said first group in said first and said third planes is approximately equal to the spacing between said first and said third planes.

5. The structure of claim 3 wherein the interelement spacing of the elements of said first group in said first plane is equal to the interelement spacing of the elements of said first group in said third plane, and wherein the interelement spacing of said elements in said first and said third planes is different from the spacing between said first and said third planes.

6. The structure of claim 4 wherein the interelement spacing of the elements of said first group is about 0.70 times the face dimension of said first group elements and wherein the depth of the elements of said second and third groups is about 2.00 to 2.20 times the width of said elements.

7. The structure of claim 6 wherein the depth of the elements of said second and third groups is about 2.10 times the width of said elements.

8. The structure of claim 1 wherein each of said elements consists essentially of a plurality of carbon fibers.

9. The structure of claim 8 wherein the end count ratio of said elements in said first, second, third and fourth groups is about 3:3:3:2.

10. The structure of claim 1 further comprising a 3-directional reinforcing structure adjacent to said 4-directional structure, wherein said 3-directional structure consists of an alpha group, a beta group and a gamma group, each group consisting of a plurality of elongated rectilinear elements in spaced parallel relation extending parallel to a respective direction and arranged in a plurality of rows; wherein said alpha group is a continuous extension of said first group of said 4-directional structure; wherein said beta group of elements is disposed in a plurality of spaced parallel planes substantially perpendicular to said first direction and extend parallel to said fourth direction in said 4-directional structure; wherein said gamma group of elements is disposed in a plurality of spaced parallel planes substantially perpendicular to said first direction and extend in a fifth direction which is perpendicular to said first direction and to said fourth direction; wherein said planes in which said beta group elements and said gamma group elements are disposed alternate, one with the other.

11. The structure of claim 10 wherein the elements of said first group have a substantially square cross section, the elements of said second and said third groups have rectangular cross sections, the elements of said fourth group have an elongated hexagonal cross section, the elements of said alpha group are the elements of said first group, and the elements of said beta and said gamma groups have a substantially square cross section.

12. The structure of claim 11 wherein the interelement spacings of the elements of said first group is approximately 0.50 to 0.75 times the face dimension of said first group elements; wherein the width of the elements of said second group, said third group, said fourth group, said beta group and said gamma group is approximately the same as the interelement spacing of said elements of said first group; wherein the depth of said elements of said second and said third groups is approximately 1.4 to 2.8 times the width of said elements; and wherein the height of the elements of said fourth group is approximately 1.50 to 3.25 times the width of said elements.

13. The structure of claim 12 wherein the interelement spacing of the elements in said first group in said first and said third planes is approximately equal to the spacing between said first and said third planes.

14. The structure of claim 12 wherein the interelement spacing of the elements of said first group in said first plane is equal to the interelement spacing of the elements of said first group in said third plane, and wherein the interelement spacing of said elements in said first and said third planes is different from the spacing between said first and said third planes.

15. The structure of claim 13 wherein the interelement spacing of the elements of said first group is about 0.70 times the face dimension of said first group elements and wherein the depth of the elements of said second and third groups is about 2.00 to 2.20 times the width of said elements.

16. The structure of claim 15 wherein the depth of the elements of said second and third groups is about 2.10 times the width of said elements.

17. The structure of claim 10 wherein each of said elements consists essentially of a plurality of fibers.

18. A maneuvering re-entry vehicle nosetip fabricated from a carbon-carbon composite material having the 4-directional reinforcement structure of claim 1 wherein said elements of said first group are oriented parallel to the axial direction of said nosetip.

19. A maneuvering re-entry vehicle nosetip fabricated from a carbon-carbon composite material having the 4D+3D reinforcement structure of claim 10 wherein the tip portion of said nosetip comprises the 3D portion of said structure and the plug portion of said nosetip comprises the 4D portion of said structure, and wherein the elements of said first group are oriented parallel to the axial direction of said nosecone.

20. A nosecone for a maneuvering re-entry vehicle, said nosecone having an associated nosetip, wherein said nosetip is fabricated from a carbon-carbon composite material having the 4D reinforcement structure of claim 1 wherein said elements of said first group are oriented parallel to the axial direction of said nosetip and wherein the elements of said first, second and third groups lie in planes parallel to the plane of bending of the nosetip and nosecone assembly.

21. A nosecone for a maneuvering re-entry vehicle, said nosecone having an associated nosetip, wherein said nosetip is fabricated from a carbon-carbon composite material having the 4D+3D structure of claim 10 wherein the tip portion of said nosetip comprises the 3D portion of said structure and the plug portion of said nosetip comprises the 4D portion of said structure, wherein the elements of said first group are oriented parallel to the axial direction of said nosetip and wherein the elements of said first, second and third groups of said 4D portion lie in planes parallel to the plane of bending of the nosetip and nosecone assembly.

* * * * *